United States Patent

Murano

[11] Patent Number: 5,315,320
[45] Date of Patent: May 24, 1994

[54] MIRROR IMAGE PRINTING PRINTHEAD
[75] Inventor: Shunji Murano, Aira, Japan
[73] Assignee: Kyocera Corporation, Kyoto, Japan
[21] Appl. No.: 766,838
[22] Filed: Sep. 27, 1991
[30] Foreign Application Priority Data
  Sep. 29, 1990 [JP] Japan .................. 2-260767
  Sep. 29, 1990 [JP] Japan .................. 2-260768
  Sep. 29, 1990 [JP] Japan .................. 2-260769
[51] Int. Cl.$^5$ .................................... B41J 2/45
[52] U.S. Cl. .................... 346/107 R; 346/154
[58] Field of Search ............ 346/107 R, 107 A, 154;
   358/300, 296, 435, 439; 395/114, 115; 340/762, 782

[56] References Cited
U.S. PATENT DOCUMENTS

| | | | |
|---|---|---|---|
| 3,021,387 | 2/1962 | Rajchman | 178/7.3 |
| 3,512,158 | 5/1970 | Scarbrough | 346/76 |
| 3,740,570 | 6/1972 | Kaelin et al. | 307/40 |
| 3,832,488 | 8/1974 | Fahey et al. | 178/15 |
| 3,988,742 | 10/1976 | Meier et al. | 346/107 |
| 4,074,319 | 2/1978 | Goldschmidt et al. | 358/230 |
| 4,074,320 | 2/1978 | Kapes, Jr. | 358/230 |
| 4,427,275 | 1/1984 | Stalzer | 346/107 R X |
| 4,455,562 | 6/1984 | Dolan et al. | 346/154 |
| 4,455,578 | 6/1984 | Fearnaide | 358/202 |
| 4,477,820 | 10/1984 | Moriguchi et al. | 358/296 X |
| 4,689,694 | 8/1987 | Yoshida | 346/107 R X |
| 4,706,130 | 11/1987 | Yamakawa | 358/300 X |
| 4,807,047 | 2/1989 | Sato et al. | 358/300 |

FOREIGN PATENT DOCUMENTS 0017264 1/1982 Japan .................. 358/296
2-235659 9/1990 Japan .

Primary Examiner—Benjamin R. Fuller
Assistant Examiner—David Yockey
Attorney, Agent, or Firm—Spensley Horn Jubas & Lubitz

[57] ABSTRACT

A print head operated on a time sharing basis. Print data are transferred from the outside into the print head in synchronization of clock pulses. The print head stores the print data in a shift register, detects input of print data for one print block portion on the basis of the number of clock pulses, then paralleltransfers the print data in the shift register to a latch circuit and at the same time shifts the print block by one block. When high-speed transfer is possible, the print head releases the external central processing unit or the like from the print head itself for a period from the input of print data of one block portion till the completion of the processing of the block. Moreover, the print head realizes mirror image printing by means of reversal of the order of the print blocks in the print head and reversal of print data in print blocks.

10 Claims, 11 Drawing Sheets

MIRROR IMAGE PRINTING PRINTHEAD

FIELD OF APPLICATION OF THE INVENTION

The present invention relates to print heads, and in particular, a print head which has signal processing functions to lighten the burden of an external central processing unit or the like.

PRIOR ART

In the print heads of the prior art, all of the signals relating to the print head are normally processed by a CPU in the printer or a CPU of an external personal computer or the like. The load on the CPU, therefore, is heavy. Moreover, it is difficult for the print heads of the prior art to make mirror image printing. The reason is that the signal processing for the print head is made by the CPU. The rearrangement of the data for mirror imaging must be executed by the CPU, and this rearrangement of the data uses a large memory of the CPU. Furthermore, the CPU is excluded from other jobs during the rearrangement of the data.

SUMMARY OF THE INVENTION

One object of the present invention is to lighten the load on the CPU by providing a print head with signal processing functions.

Another object of the invention is to transfer print data from the CPU according to a print data request signal, terminate the transfer of the print data according to a print data stop signal, and release the CPU for a period from receipt of the print data stop signal to receipt of the print data request signal.

Another object of the invention is to accomplish high-speed data processing for mirror imaging without using a large memory.

The print head according to the present invention comprises a print means for printing print data corresponding to the respective lines, said print means being divided into a plurality of print blocks and said print blocks being operated one at a time, a storage means for storing print data externally inputted by serial transfer, a block detecting means for generating a block detect signal upon input of print data for one block according to the number of clock pulses externally inputted in synchronization with the print data, and a block selecting means for shifting the print block of the print means by one block and driving it according to the block detect signal.

The print means may be, for example, a set of light emitting diodes for a single print line, said diodes being divided into a plurality of print blocks, or a set of heaters for a single print line, said heaters being divided into a plurality of print blocks.

The storage means may be, for example, a shift register, and print data of one print block portion are preferably parallel-transferred to a latch circuit upon receipt of the block detect signal.

The block detecting means may comprise, for example, a counter. The counter counts the clock pulses synchronized with the print data to detect input of print data of one block portion. The block detecting means may use a shift register in place of a counter. A counter with a base number n may be replaced with a n-place shift register; the signal of the nth place of the shift register is used.

After transfer of print data of one block portion, the transfer of print data is terminated by a print data stop signal. Upon completion of printing of the block, a print data request signal will be generated to restart transfer of print data. In this way, the relationship between the print head and the external CPU or the like is simplified into an interruption according to a print data request signal and the termination of the interrupt according to a print data stop signal. When the relationship between the print head and the external CPU or the like is simplified into an interrupt and release of the interruption, the communication protocols between them will be clarified and their designs will be improved in degree of freedom and adaptability.

The CPU transfers print data serially according to the print data request signal, and transmits clock pulses for synchronization. The print head detects that print data for one block portion have been fed according to the number of clock pulses and generates the block detect signal. Upon the block detect signal, the print head will terminate the transfer of print data, and at the same time shift the print block by one block. Next, when the printing of one block portion is completed, the print head will transmit a print data request signal to the CPU. In place of the CPU, an output buffer, DMA controller or the like being connected to a CPU may be connected to the print head.

The print means are fed with print data according to a strobe signal or the like based on the block detect signal. The width of the strobe signal is preferably set at that of the print time, and a print data request signal is generated upon the termination of the strobe signal.

The print head according to the present invention is capable of processing all signals inside the print head, except signals relating to print data input and some control signals from the CPU such as the reset (system reset) signal. As a result, the time of the CPU or the like required for printing will be reduced, and the CPU and the print head will be able to operate independently of each other. The strobe signal for feeding print data to the print means may be given from the CPU by transferring a strobe request signal to the CPU. This is because it is important to make printing only after the CPU is notified of the completion of data transfer, the completion of data transfer is verified and latching is made.

Change to a print block is effected, for example, in the following manner. The counter of the block selecting means counts block detect signals. The output from the counter equals the serial number of the print block to be selected, provided the reset conditions are appropriate. The block change signal of the counter will be decoded by an appropriate decoder to drive the print block to be selected. A driver such as a switching transistor is provided between the decoder and the print blocks, and the print blocks are driven by the driver in time sharing mode.

It is desirable to internally reset the print head for each line. The internal resetting may be effected by detecting input of print data for one line portion with the final block detecting means and resetting the block detecting means or the block selecting means.

When an external CPU is capable of transferring print data only at a low speed, it will be necessary to transfer print data from outside continuously. In such a case, whenever input of print data of one block portion is detected, print data will be transferred from the storage means to the latch circuit, and print data will continued to be inputted into the storage means.

As mentioned above, in the mode for continuously transferring print data, the operation of the print blocks of light emitting diodes, heating elements, etc. will delay relative to external print data by one block portion. This is due to the arrangement wherein upon the completion of input of print data of one block portion, the data is transferred from the storage means to the latch circuit, a block is selected, and then a strobe signal is generated to print the data. It, therefore, is desirable to input additional dummy clock pulses of one block portion to the block detecting means after inputting print data for the final block. During this dummy clock period, the latch circuit transfers the print data for the final block, and the block selecting means select the final block. When dummy clock is not used, a timer, for example, may be provided within the print head to effect printing of the final block.

Now, the mirror image printing will be explained. Mirror image printing is to print a reversal of print data such as a character, diagram, etc. as shown in FIG. 7. In addition to the use for reversed images, mirror image printing is required when print head must be mounted reversely for the convenience. Mirror image printing may be achieved by, for example, constituting the block selecting means with an up-down counter and reversing the polarity of input to the up-down counter by means of the signal from the mode determining means. Alternately, the block selecting means may be composed of a shift register. Bits are set in the shift register at the head of the line (the head of print line), and the bits are shifted to the right or to the left by the block detect signal. The shift direction of bits is reversed by the signal from the mode determining means. In this way, the order of the print blocks may be reversed. To reverse the order of print data in a block, the input direction reversing means may be used to reverse the direction of input in the block to the storage means of print data.

The principle of mirror imaging is shown in FIG. 8. For instance, suppose there are 40 print blocks L1-L40. To achieve mirror imaging, it is sufficient to reverse the order of the blocks L1-L40 and at the same time to reverse the data direction in each block. To reverse the data direction in each block, the storage means for print data may be composed of a shift register. The direction of input to the shift register is reversed according to the print mode. A zigzag type data bus structure is used in the embodiments. When the data bus structure is of the type shown in the embodiments and the number of the print blocks is even, the data direction in each block is reversed. Hence it is sufficient to reverse the order of selection of blocks by means of the block selection means. With this data bus structure, however, the order of print data is reversed block by block. Accordingly, the direction of input of print data to the shift register is reversed block by block by means of the input direction reversing means. When the data bus structure is the type of the embodiments and the number of blocks is odd, the data direction in each block is reversed from that of the normal mode by means of the input direction reversing means and the order of selection of blocks is reversed by the block selecting means. In this case, the signal of the input direction reversing means is also reversed block by block. For data bus structures other than the zigzag type, means for reversing the direction of input to the shift register is used.

BRIEF DESCRIPTION OF DRAWINGS

FIG. 1 is a circuit diagram of the first embodiment.

FIG. 2 is a diagram showing the data bus structure of the embodiment.

FIG. 3 is a flow chart showing the operating algorithm of the embodiment.

FIG. 4(1) through (10) are waveform diagrams showing the operation of the embodiment.

FIG. 5 is a circuit diagram showing the block selection means of a modification.

FIG. 6 is a diagram illustrating the mounting of the print head of the embodiment onto a printer.

FIG. 7 is an explanatory diagram showing the principle of mirror imaging.

FIG. 8 is a diagram showing the mirror imaging of the embodiment.

FIG. 9 is the circuit diagram of the second embodiment.

FIG. 10 is the operating flow chart of the second embodiment.

FIG. 11(1)-(10) and FIG. 12(1)-(10) are operating waveform diagrams of the second embodiment.

FIG. 11(1) through (18) show the operating waveforms of the line reset mode. FIG. 12 (1) through (10) show the operating waveforms of the page reset mode.

FIG. 13 (1) through (7) are operating waveforms of the second embodiment, illustrating the use of dummy clock.

FIG. 14 (1) through (6) are operating waveform diagrams showing the operating timing of the second embodiment.

DETAILED DESCRIPTION OF THE PREFERRED EMBODIMENTS

Embodiment 1

The print head according to the present invention divides one line printing into a plurality of print blocks to achieve time sharing printing block by block. Such print heads include, for example, time-sharing type photo-print head and thermal print head.

In reducing the present invention to practice, the shift register, counter, etc. may be individually designed with TTL, C-MOS, etc. When the light-emitting diode blocks are excepted, it is the transistor array that takes the largest area in the embodiment. It, therefore, is desirable to integrate the shift register, counter and transistor array into one chip by means of a bipolar C-MOS, etc.

Figure 6:
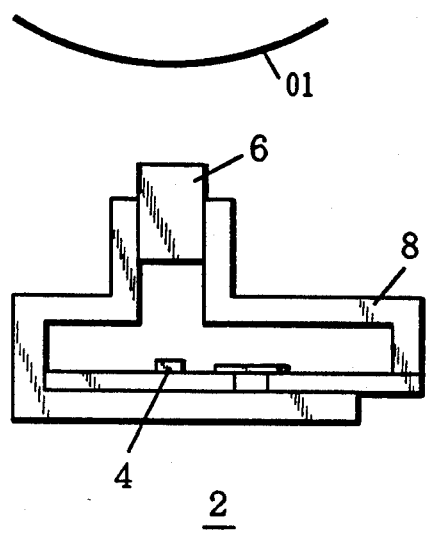
Figure 7:
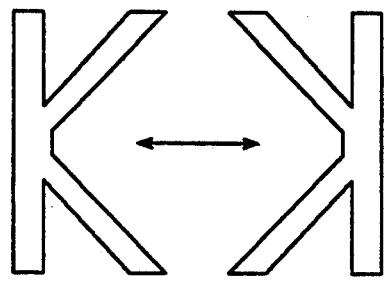
Figure 8:
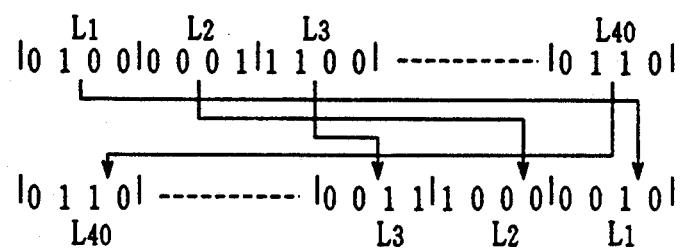

The first embodiment will be explained below by way of a photo-print head. The external configuration of a photo-print head 2 is shown in FIG. 6. In the diagram, 4 denotes light emitting diodes (LEDs). For instance, 64 LEDs are integrated into a chip and used as a LED print block. A total of forty print blocks (2560 LEDs), for example, may be used, and they may be operated in the time sharing mode with a cycle of, for example, 1.2 msec (30 μsec per block). 6 denotes a lens array, and 8 denotes a housing. 01 denotes a photoreceptor drum. The print head is asymmetrical due to the related circuits stored in it, and in turn, has some restrictions in its mounting orientation to the printer. Mirror imaging makes it possible to reverse the orientation of the print head 2. In addition to it, mirror imaging may be used in reversing diagrams such as drawings or in printing artistic characters. An example of mirror imaging of a character is shown in FIG. 7. A character K is reversed in this case.

For the convenience of explanation, the diagrams of the embodiment show more circuits than actually required. For example, the latch signal according to the block detection signal, the signal for reversing the direction of input to the shift register (SWLR), the strobe signal, and the data stop signal are generated separately. These signals, however, may be generated by a single circuit, and they may be directly generated in the block detection means.

Figure 1:
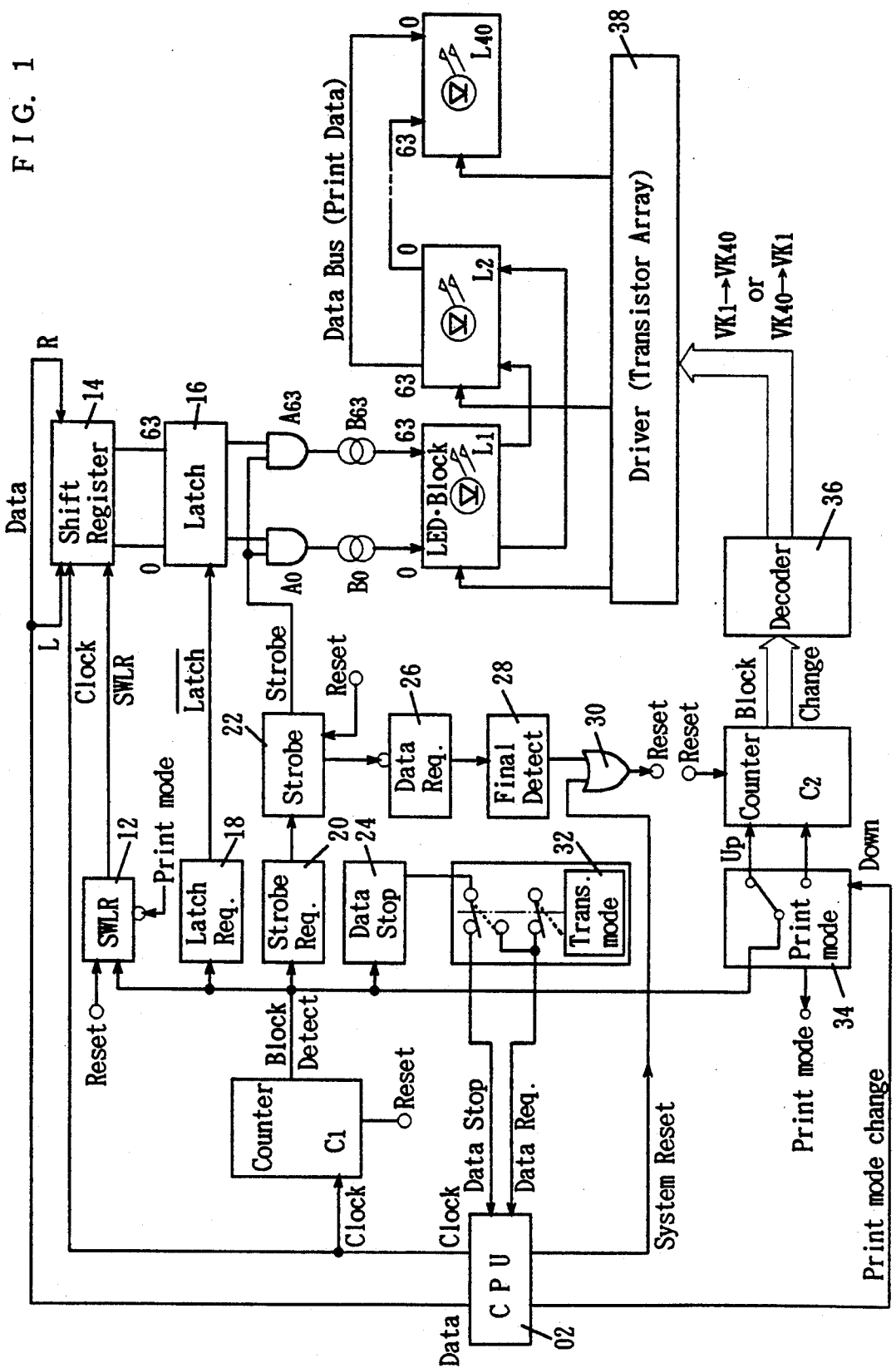
FIG. 1 through FIG. 8 illustrate the first embodiment.

The circuit diagram of the first embodiment is shown in FIG. 1. In the diagram, 02 denotes the central processing unit in a printer, and it may be a CPU of a computer or a facsimile machine or an output buffer of such machines. 12 denotes the means for reversing the direction of input to the shift register, and may be comprised of a DFF, etc. 14 denotes a 64-bit shift register, and 16 denotes a 64-bit latch circuit. A0 through A63 are AND gates, and B0 through B63 are constant current circuits. When signals from the shift register 14 are parallel-outputted to the AND gates A0 through A63 by a strobe signal in the high-speed data transfer mode, the latch circuit 16 is not required. C1 and C2 denote counters. The counter C1 has a base number of 65 (the initial value is zero, and the maximum value is 64). The counter C2 has a base number of 41 (the initial value is zero, and the maximum value is 40). The output of the counter C1 is the block detect signal, and the output of the counter C2 is the block change signal.

Numbers 18 through 26 denote a group of one-shot multivibrators, and they can be integrated into one timer. The outputs of the one-shot multivibrators 18 through 26 may be directly taken out of the counter C1 via an appropriate decoder. 18 denotes a latch signal generating circuit for parallel-shifting the print data of the shift register 14 into the latch circuit 16. 20 denotes a circuit for requesting generation of a strobe signal. 22 is the strobe signal generating circuit. 24 is the circuit for generating the print data stop signal. 26 is the circuit for generating the print data request signal. 28 is the circuit for detecting the terminal block; the circuit uses a counter to detect input of data for blocks of one line portion and generate the internal reset signal. 30 is an OR circuit that resets the print head according to the system reset signal from the CPU 02 or the internal reset signal. In the present embodiment, a terminal block detecting circuit 28 is provided independently of the counter C2. The counter C2, however, may serve as the circuit as well.

32 is the data transfer mode select switch. It selects either high-speed block transfer or low-speed continuous transfer for print data transfer. In the high-speed block transfer mode, whenever print data for one block portion are received, the data transfer will be interrupted by a print data stop signal. When the printing by the block is completed, print data for the next block will be transferred according to a print data request signal. Print data, therefore, are transferred at high speed, and the CPU 02 will be released from the print head for a period from the print data stop signal to the print data request signal. In the continuous transfer mode, print data are transferred at low speed. After transfer of data for one block portion, transfer of data for the next block will be continued, and the print data stop signal is used as the print data request signal. Provision of the data transfer mode select switch 32 is to provide the print head with versatility so that the print head can serve a CPU that can make high-speed data transfer as well as a CPU that can make low-speed continuous data transfer only.

34 denotes a switch for selecting print mode from the normal mode or the mirror image mode. 36 denotes a decoder. 38 denotes a driver comprising of, for example, 40 switching transistors. L1 through L40 denote LED print blocks, each integrating 64 LEDs.

Figure 2:
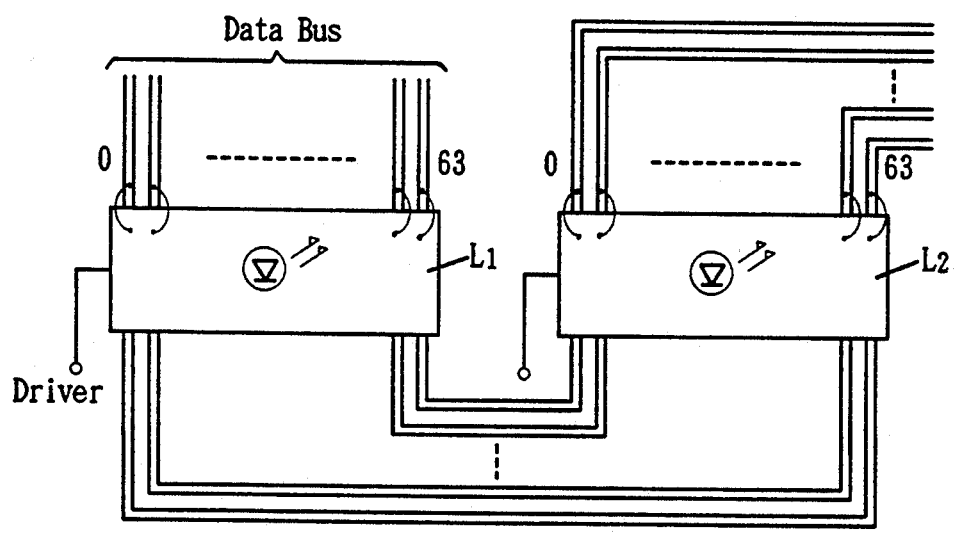

The data buses of the present embodiment zigzag connect 40 LED blocks L1 through L40 with the constant current circuits B0 through B63 and the latch circuit 16 as shown in FIG. 2. Since the data buses have a zigzag configuration, the order of print data is reversed LED block by LED block. For instance, if the LED on the right end of the block n is connected to the first data bus, the LED on the right end of the block n+1 will be connected to the 64th data bus. Moreover, if the LED on the left end of the LED block L1 on the left of the diagram is connected to the first data bus, the LED on the right end of the LED block L40 on the right end of the diagram will be connected to the first data bus. The zigzag arrangement of the data buses is intended to ease wire bonding by passing the data buses beneath the blocks L1 through L40 as shown in FIG. 2.

The major signals are shown in Table 1.

TABLE 1

| | Signals |
|---|---|
| Latch | Transfer the signal from the shift register 14 to the latch circuit 16. |
| SWLR Signal | Specify the direction of input to the shift register 14 rightward or leftward. |
| Strobe Signal | Demand printing. Turn on the gates A0–A63 connected to the latch circuit 16. |
| Block Detect Signal | Output of the counter C1. Alter the counting of the counter C2 by 1. |
| Block Change Signal | Output of the counter C2. It is decoded by the decoder 36. |
| VK1–VK40 | Outputs of the decoder 36. They drive the driver 38. |
| Print Data Request Signal | Requests the CPU 02 to transfer input data. |
| Print Data Stop Signal | Request the CPU 02 to stop transferring print data. |
| Reset | It is generated by the internal reset signal or the system reset signal. It resets the counters C1 and C2 and the input direction reversing means 12. |
| Mirror Image (PRINT MODE Change) | Switch over the counter C2 from an up-counter to a down-counter. |

Now, the SWLR signal and the reversal of the data direction in a block will be explained. The function of the SWLR signal is to reverse the direction of input to the shift register 14. When the value of the SWLR signal is reversed, the order of the print data in the block will be reversed. Since the zigzag type data bus structure is used in the embodiment, the data bus structure reverses the order of print data block by block. The methods for switching over between the normal mode and the mirror image mode are as follows. When the data bus structure is that of the embodiment and the number of the LED blocks L1–L40 is even, the direction of connection between the data bus and the LED of the block L1 is opposite to that of the block L40. Hence the SWLR signal is left just as for the normal mode, and it is sufficient just to switch over the direction of the block change signal. When the data bus structure is that of the embodiment and the number of LED blocks is odd, the direction of connection to the data bus of the last block is identical to that of the first block. Hence the SWLR signal is reversed to select the mirror image mode. Reversal of data directions in blocks may be summarized as follows:

(1) When the data buses are parallel to the LED blocks L1–L40 and the data buses and the LED blocks are connected always in the same direction, the mirror image mode is realized by the SWLR signal. In this case, there is no switch-over of the SWLR signal in the middle of the line. The value of the SWLR signal at the top of the line is selected according to the selected mode.

(2) When the data buses reverse LED block by LED block as is the case of the embodiment and the number of the LED blocks is even, the mirror imaging can be achieved by the data bus structure. It, therefore, is sufficient to reverse the operating order of the print blocks L1–L40. In this case, the SWLR signal is switched over block by block.

(3) When the data buses reverse LED block by LED block and the number of LED blocks is odd, the value of the SWLR signal at the top of the line is reversed, depending on whether the mirror image mode is selected or not. Moreover, the operating order of the print blocks is reversed. In this case, the SWLR signal is reversed block by block.

Now the method for reversing the block order by reversing the operating order of the print blocks L1–L40 will be explained. This function is essential to the mirror imaging. If the order of the print block operating signal is from VK1 to VK40 in the normal mode, the order of the signals in the mirror image mode is from VK40 to VK1. This may be achieved with an up-down counter C2 and a decoder 36. In the normal mode, for example the initial value of the up-down counter C2 is set at 0, and the block detect signal increments the value by one at a time. On the other hand, in the mirror image mode, the initial value of the counter C2 is set at 0, and the block detect signal decrements the value by one at a time. The functions related to the mirror imaging are listed in Table 2.

TABLE 2

| | Mirror Imaging | |
|---|---|---|
| | Normal mode | Mirror image mode |
| SWLR | | |
| Data bus structure of the embodiment and even number of blocks. | H at the top of the line. (After that, SWLR is reversed block by block.) | H at the top of the line. |
| Data bus structure of the embodiment and odd number of blocks. | H at the top of the line. (After that, SWLR is reversed block by block.) | L at the top of the line. |
| The data buses are parallel with blocks. | H (The SWLR signal is not reversed block by block.) | L |
| Up-down counter C2 | 0 at the top of the line. 1 at the 1st block. Increment by 1 at a time. | 0 at the top of the line. 40 at the 1st block. Decrement by 1 at a time. |

Figure 3:
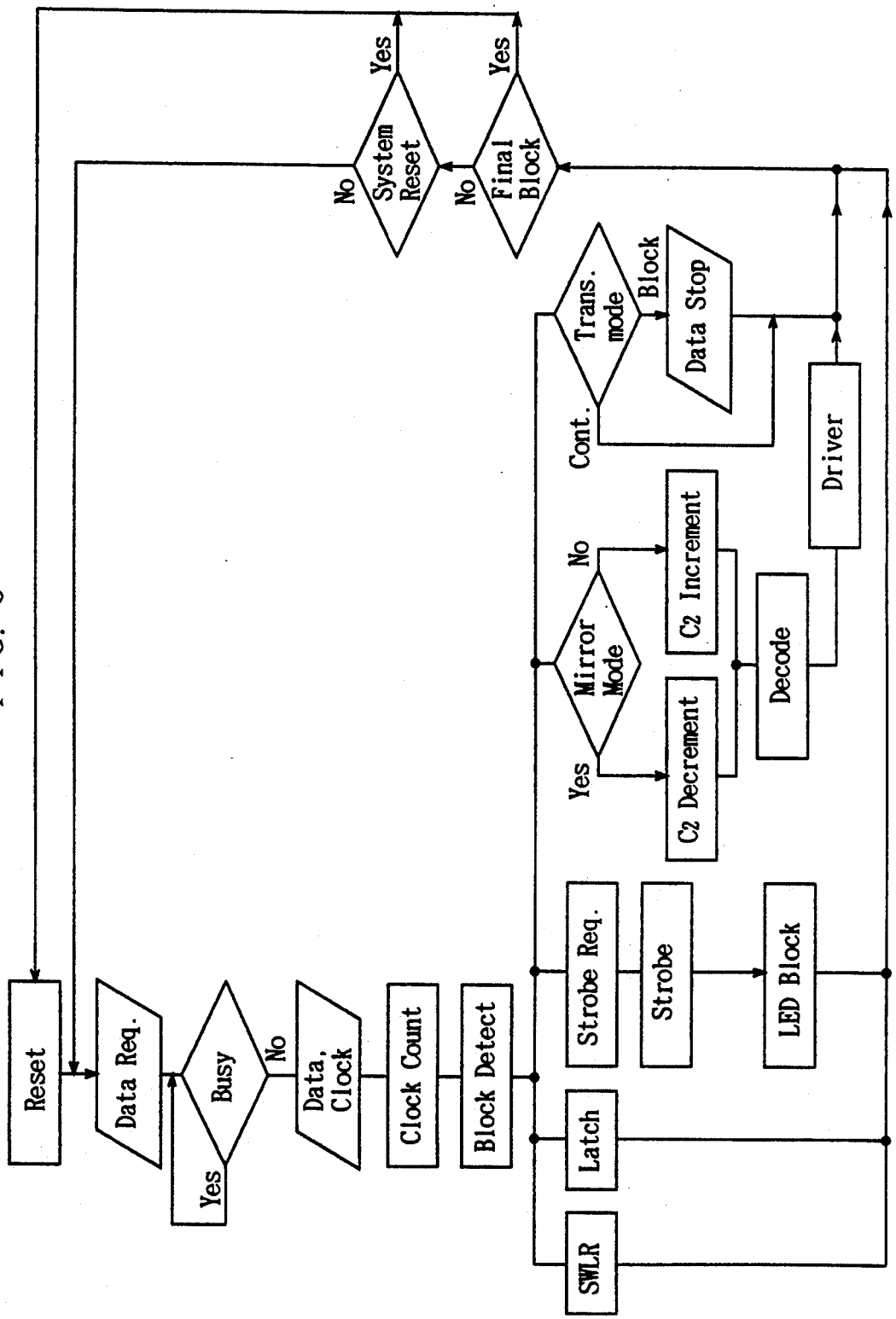

The operation algorithm of the embodiment is shown in FIG. 3. This algorithm is for the high-speed block transfer mode. The processes shown in parallel with each other are executed concurrently. The operation of the print head 2 is started by the system reset signal from the CPU 02. When this signal is applied, the counters C1 and C2 will be reset by the OR circuit 30, and the value of the SWLR signal is restored to the original value. After that, the CPU 02 transfers print data for the first block portion and clock pulses into the print head 2. The transfer of print data for the subsequent block portion will be started when the print head 2 transfers the print data request signal to request an interrupt to the CPU 02. When the CPU 02 receives the interrupt, the CPU 02 will transfer print data and clock pulses serially. The counter C1 checks the number of clock pulses, and when it counts up the clock pulses for one block portion it will output a block detect signal.

When the print head 2 detects the block, in case of the high-speed block transfer mode, the print head 2 will stop the data transfer by the print data stop signal and release the CPU 02. In the low-speed continuous transfer mode, the print head 2 uses the print data stop signal as the print data request signal, and continues to transfer print data for the next block after the transfer of the print data for the previous block portion. In both transfer modes, the print head 2 reverses the value of the SWLR signal to reverse the direction of input to the shift register 14 for the next block whenever it detects a block. The print head 2 uses the latch signal to effect parallel transfer of print data of the shift register 14 to the latch circuit 16. Next, the print head 2 uses the strobe request signal to generate the strobe signal, and uses the strobe signal to turn on the AND gates A0–A63 and feed the print data to the data buses. In the normal mode, the print head 2 increments the counter C2 by 1 according to the block detect signal. In the mirror image mode, the print head 2 decrements the counter C2 by 1. The print head 2 decodes the value of the counter C2 with the decoder 36 and selects one block from the LED blocks L1–L40 by the VKn signal and drives it with the driver 38.

When the strobe signal is terminated, the print head will judge whether the latest block is the final one or not. If it is not the final block, the print head 2 will generate the print data request signal to request print data for the next block. If it is the final block, the print head 2 will generate the internal reset signal to reset the counters C1 and C2 and set the SWLR signal at the initial value. After that, the print head 2 will request the next print data.

Figure 4:
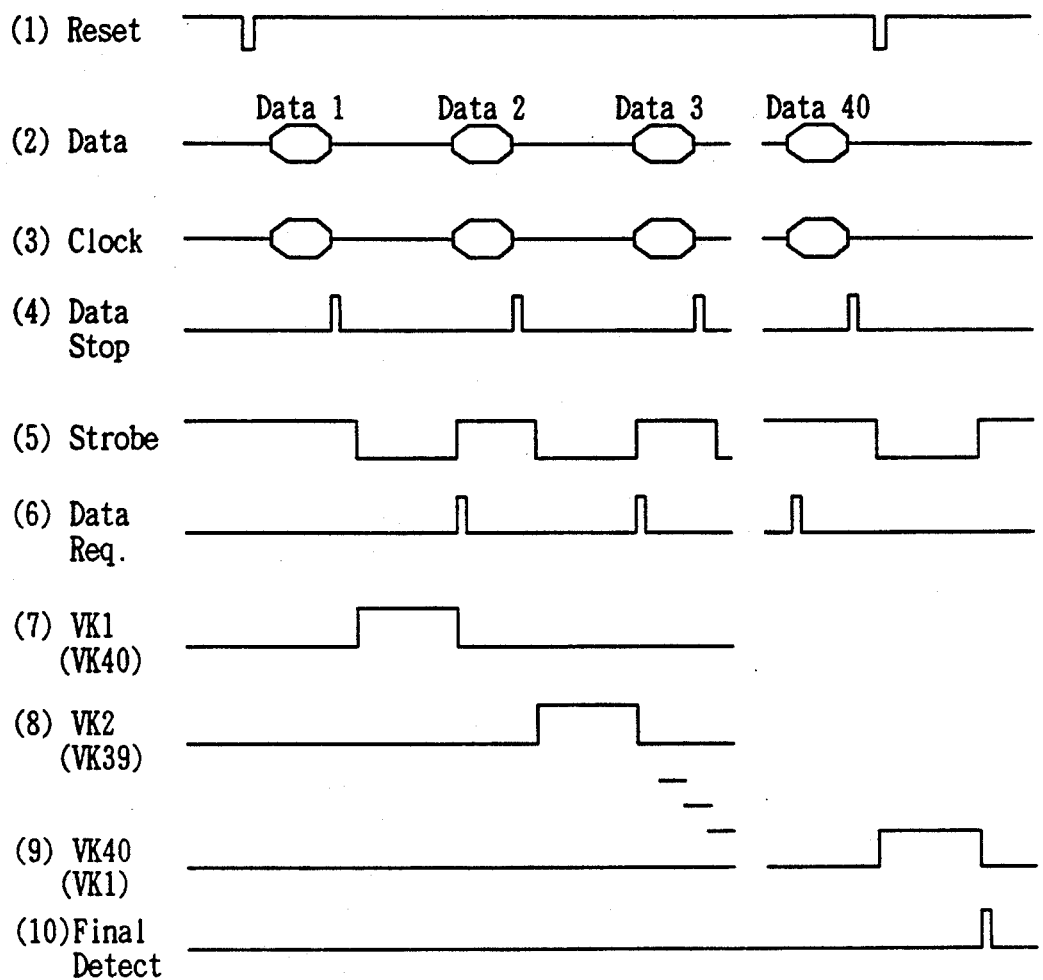

The operating waveforms of the embodiment are shown in FIG. 4. The behaviors in parentheses of (7) through (9) of FIG. 4 are for the case of the mirror image.

Figure 5:
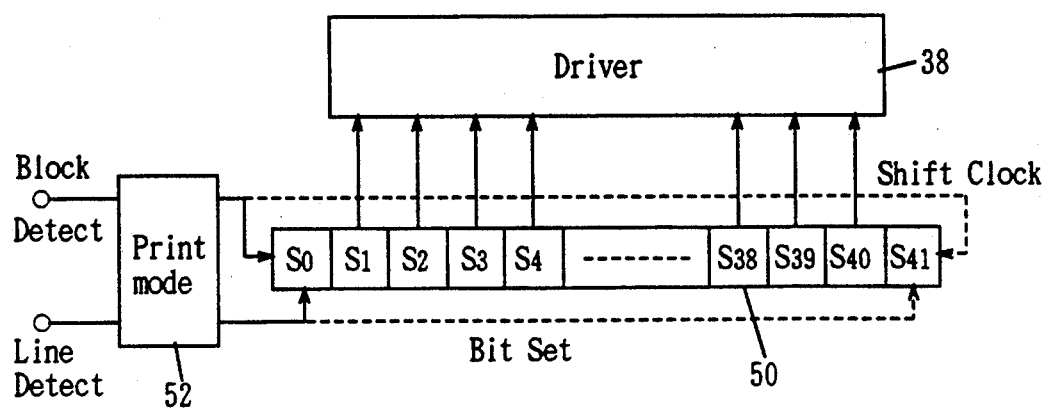

One modification is shown in FIG. 5, in which a 42-bit shift register 50 is used in place of the up-down counter C2 and the decoder 36. 52 denotes a mode determining means. Except this portion, the modification is identical to the embodiment of FIG. 1. The mode determining means 52 is a switch which determines whether the bit to be set at the head of a line is set at the left end (S0) or the right end (S41) of the shift register 50. The mode determining means 52 also determines whether the bit set in the shift register 50 is shifted rightward or leftward by the block detect signal. The block detect signal is a shift clock for the shift register 50. In the normal mode, the bit set in the shift register 50 is shifted in the order of S0 to S1 to S2. On the other hand, in the mirror image mode, the bit set in S41 is shifted in the order of S40 to S39 to S38. The broken lines of the diagram indicate the flow of signals in the mirror image mode. The solid lines indicate the flow of signals in the normal mode. In the modification of FIG. 5, mirror imaging is effected by reversing the set position and shifting direction of the bit of the shift register 50.

It should be noted that the interface with the CPU 2 shown in the embodiment is one example designed to shorten the time of the print head 2 occupying the CPU 02 and is not limited to it in any way. The reasons for adopting such an interface are as follows:

(1) To simplify the relationship between the CPU 02 and the print head 2 into an interrupt by the data request signal and release of the interrupt by the data stop signal, and at the same time, to shorten the time of the print head 2 occupying the CPU 02.

(2) To process most of the signals of the head 2 within itself and release the CPU 02.

(3) To improve the independency of the head 2 and the CPU 02 from each other and make them more compatible to each other.

Embodiment 2

FIG. 9 through FIG. 14 show an embodiment suited to the low-speed continuous transfer mode. In this embodiment, the signals from the CPU 02 are reduced to the minimum, i.e. print data, clock pulse and system reset signal. In addition to these signals, the print head may partly rely on the CPU 02. For example, if the CPU 02 generates the strobe signal, the print head may use the strobe signal from the CPU 02.

In this embodiment, the CPU 02 constantly inputs print data and clock pulses in the print head. However, if the CPU 02 has an appropriate buffer, the CPU 02 can be released from the print head after outputting the data to the buffer.

In the embodiment, a shift register is used as the storage means, and the signal for the data transfer from the shift register to the latch circuit (latch signal), signals for the change of LED block (block detect signal and block change signal) are effected in the print head. The strobe signal, internal reset signal, signal for reversing the direction of input into the shift register (SWLR), etc. are generated inside the print head to free the CPU 02 from the management of the print head. Identical denote identical items of the embodiment of FIG. 1 through FIG. 8.

Figure 9:
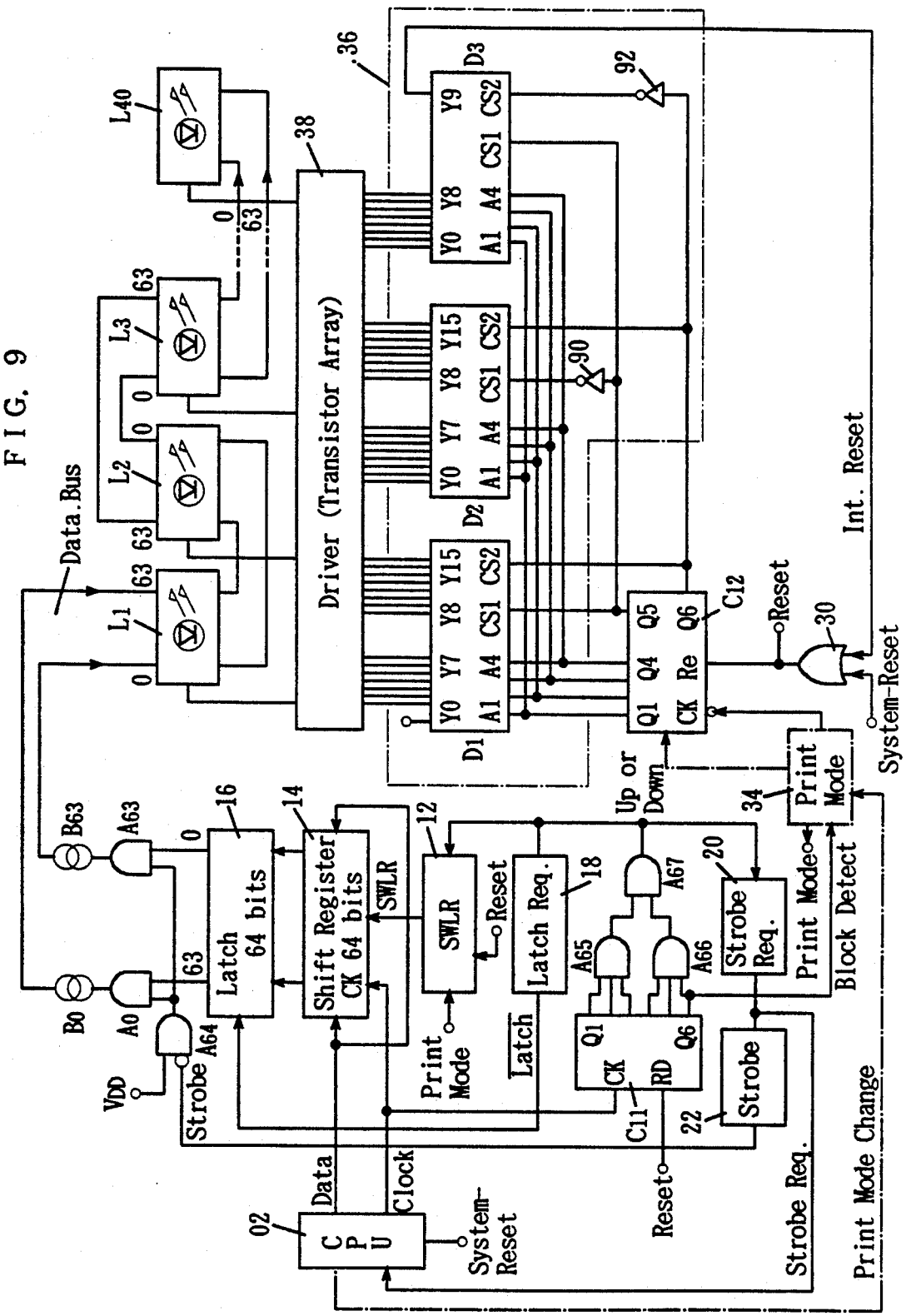
FIG. 9 through FIG. 14 show the second embodiment.

FIG. 9 shows the circuit diagram of the embodiment. C11 denotes a counter with a base of 64 (the initial value is 0 and the maximum value is 63) for detecting the block. A65 through A67 denote AND gates for decoding. C12 denotes a counter with a base of 64 (the initial value is 0 and the maximum value is 63) for counting the number of blocks. In this embodiment, the circuit for demanding the generation of the strobe signal 20 transmits the strobe request signal to the CPU 02 as well so as to report the completion of input of print data for one block. If the CPU 02 generates the strobe signal, the strobe signal may be received not from the strobe signal generating circuit 22 but the CPU 02.

In this embodiment, the details of the decoder 36, of which details are omitted in FIG. 1, will be explained. D1, D2 and D3 are separate decoders. Decoders D1 and D2 have a base of 16, and the decoder D3 has a base of 10. 90 and 92 denote inverters. The terminals CS1 and CS2 of the decoders D1, D2 and D3 are terminals for inhibiting decoder output. The decoder D1 decodes the signals Q1 through Q4 of the lower 4 bits of the counter C12. When the signals Q5 and Q6 of the upper 2 bits are present, the decoder D1 will not transfer the decoder outputs to the transistor array 38. The output terminal Y0 (decoded signal 0 of the counter C12) of the decoder D1 is an open terminal. The decoder D2 decodes when the signals (Q5, Q6) of the upper 2 bits of the counter C12 are (1, 0). The decoder D3 decodes when the signals (Q5, Q6) of the upper 2 bits of the counter C12 are (0, 1). In this manner, decoded signals with a base of 40 are taken out of the counter C12 with a base of 64. The output of the terminal Y9 of the decoder D3 (corresponding to an output count of 41 from the counter C12) resets the counter C12; thus the counter C12 is virtually used as a counter with a base of 41. It should be noted that this embodiment operates in the mirror image mode as well with the modification shown by chain line in the diagram. To this end, a switch 34 is provided to select the mirror image mode or the normal mode, and the mode signal from this switch is inputted into the input direction reversing means 12. An up down counter with a base of 41 may be used as the counter C12. The initial value at the time of resetting is set at 0, and the counter is incremented from 1 up to 40 in the up-counter operation, and the counter is decremented from 40 down to 1 in the down-counter operation. In this way, the rightward leftward order of the data in the block relating to mirror imaging is processed by the input direction reversing means 12. The selection of the block direction is processed according to whether the counter C12 is up-counting or down-counting.

The major signals of FIG. 9 will be explained. The latch signal is active-low, and is generated from the rise of the final clock pulse for a block to the counter C11 till the rise of the next clock pulse. The latch signal effects parallel transfer of print data from the shift register 14 to the latch circuit 6. The SWLR signal designates whether the direction of input to the shift register 14 is rightward or leftward. The strobe signal is the print command and opens the AND gates A0 through A63 connected to the latch circuit 16. The block detect signal is generated by input of 64 clock pulses. For the convenience of timing, it is taken out in two stages in this embodiment. The block detect signal for the strobe signal generation demand circuit 20 or the like is generated when the output of the counter C11 is 63 (the initial value is 0). The signal for the counter C12 is generated when the output of the counter C11 changes from 0 to 63, and the counter C12 is incremented by 1 by this pulse. The output of the counter C12 is the block change signal, and this signal is decoded by the decoder 36. Vk1 through VK40 denote outputs of the decoder 36. VK1 operates the LED block L1, and VK40 operates the LED block L40. There are 64 data buses between the constant current circuits B0–B63 and the LED blocks L1–L40, and the order of the print data is reversed block by block as shown in FIG. 2. When the output of the counter C12 is 0, it indicates the print data for the first block of a line is being inputted into the shift register 4. When the output of the counter C12 is 1, the first block L1 will be operated. Hence the terminal Y0 of the decoder D1 is not connected to the transistor array 38. The final block L40 prints for the time of one block portion after the input of the print data for 40 block portions. Hence dummy clock pulses for one block portion are additionally inputted into the counter C11 after the input of the print data for 40 block portions. Thus clock pulses for one line are for 41 block portions. The internal reset signal is generated when the decoder D3 decodes that the counter C12 reaches 41. The system reset is the reset signal from the CpU 02. It has two modes; reset line by line, and reset page by page. These signals are processed by the reset circuit 30 to reset the counters C11, C12 and the input direction reversing means 12. Each system reset signal has a role of initializing the print head before the start of operation. The operation of the print head starts with the system reset signal.

Figure 10:
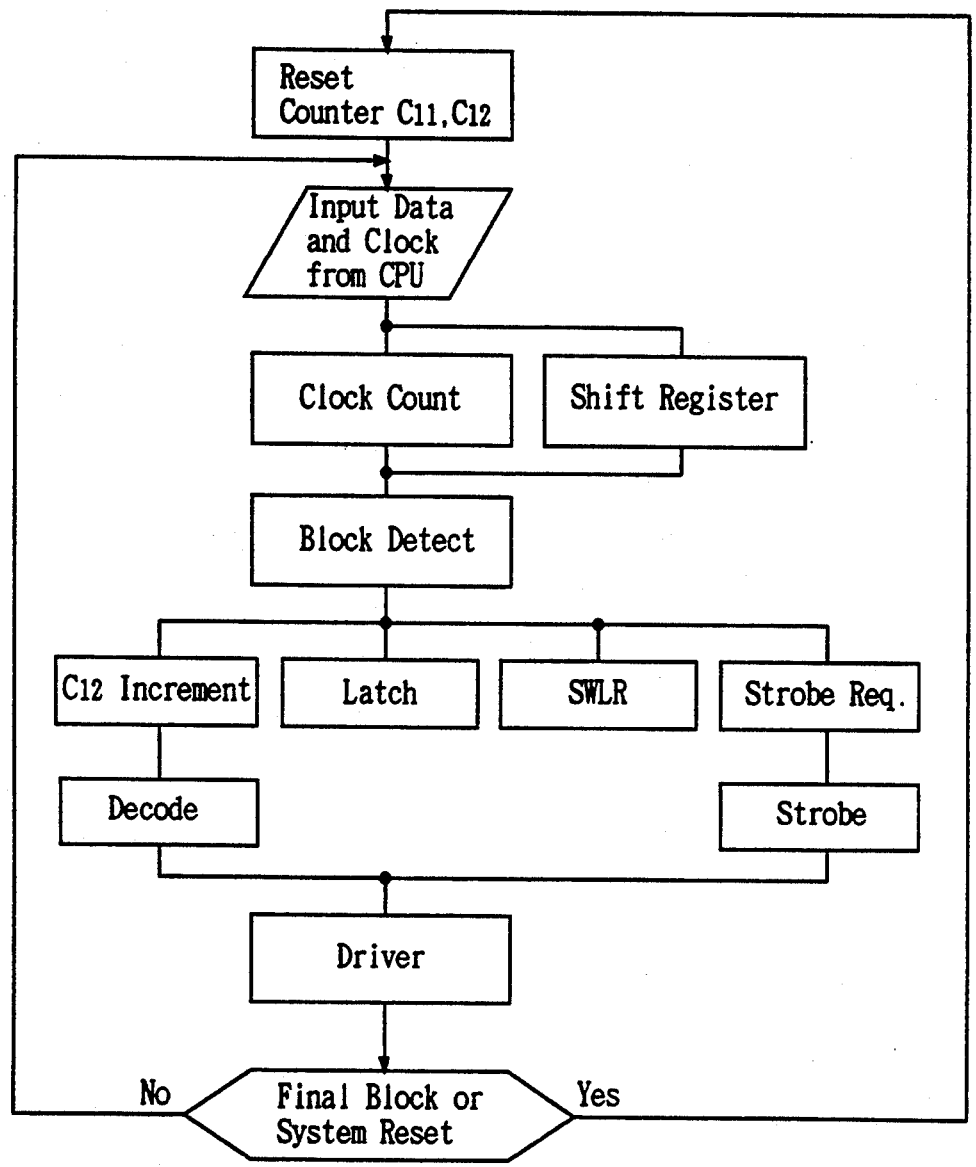

FIG. 10 through FIG. 14 show the operation of the embodiment. FIG. 10 shows the operating algorithm of the embodiment. The respective processes shown in parallel with each other are executed concurrently. The counters C11 and C12 and the input direction reversing means 12 are reset by the system reset signal. Next, the print data and clock pulses are serially transferred from the CPU 02. Clock pulses for one block portion are counted by the counter C11 to generate the block detect signal. The print data of the shift register 14 are parallel-transferred to latch circuit 16 by the block detect signal. At the same time, the direction of input to the shift register 14 is reversed by the input direction reversing means 12. One clock pulse after the block detect signal, the strobe signal is generated, and print data are fed by the strobe signal into the bus lines via AND gates A0-A63. The block detect signal is inputted into the counter C12 to count the number of blocks, and the block change signal based on the counting is used to select a block with decoders D1 through D3 and operate the transistor array 38. As a result, the LED blocks L1-L40 are operated on the time-sharing basis by the print signals from the data buses and on-off of the transistor array 38. After the input of the print data for one line portion, dummy clock pulses for one block portion are inputted for printing of the final block. When the printing of the final block is completed, the output of the terminal Y9 of the decoder D3 will be used to generate the internal reset signal. The internal reset signal resets the print head. The print head waits for the next input data and clock pulses for the next line (line reset mode) or the next page (page reset mode).

Figure 11:
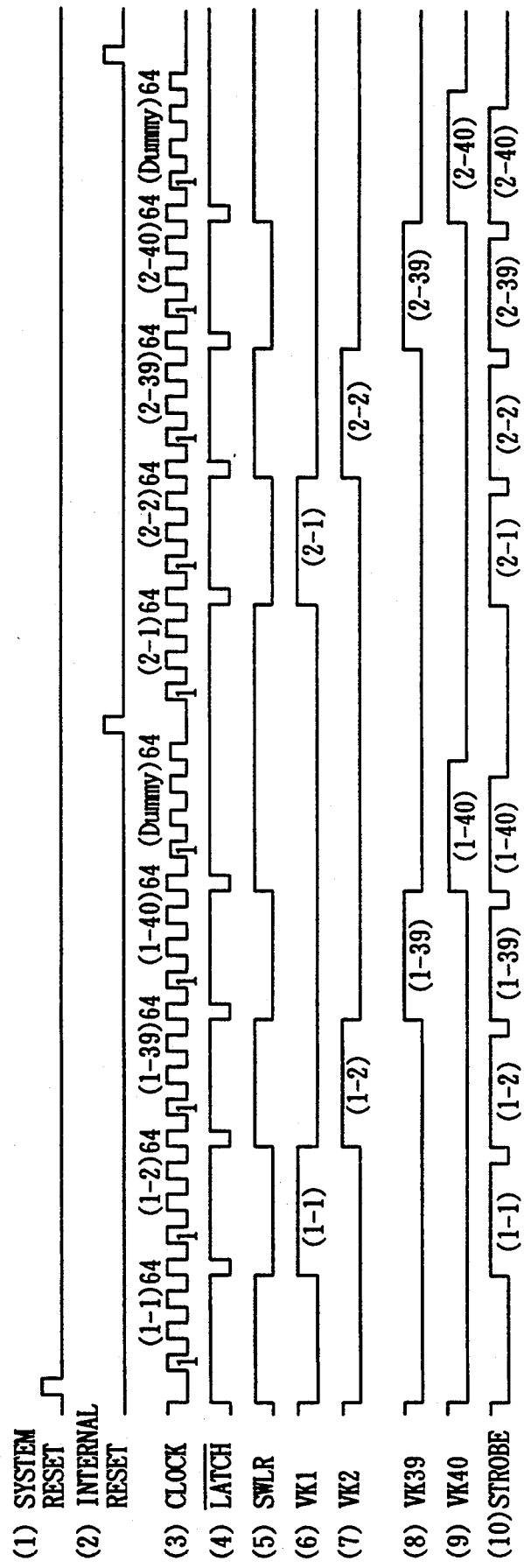
Figure 12:
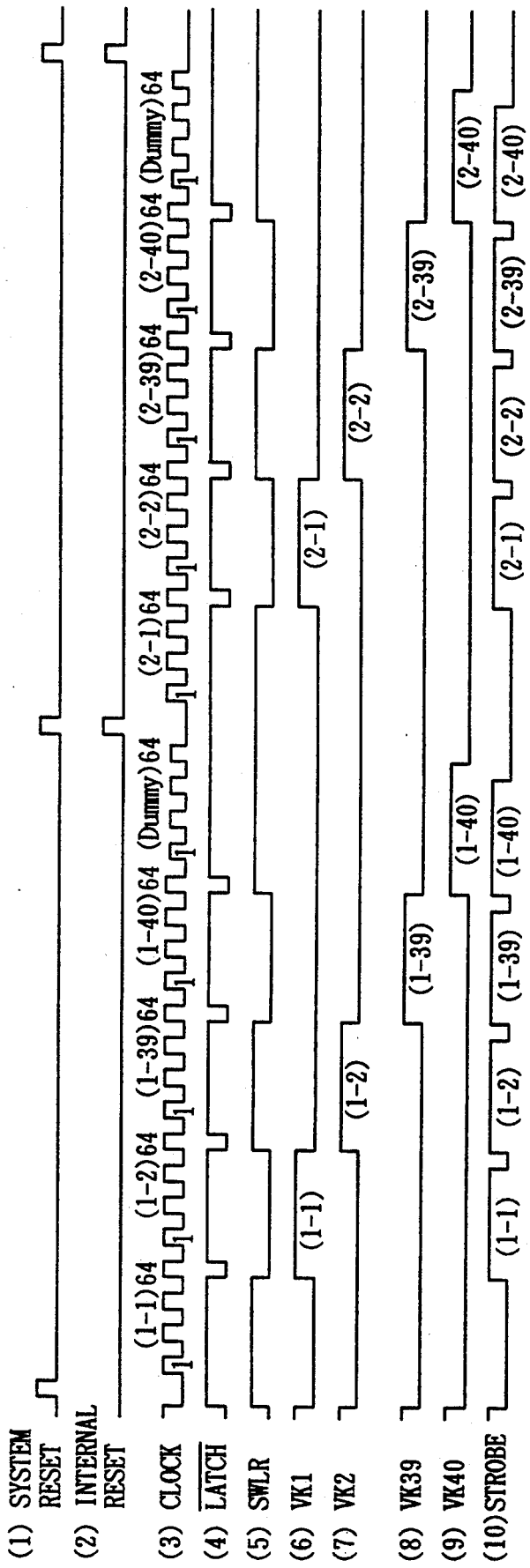
Figure 13:
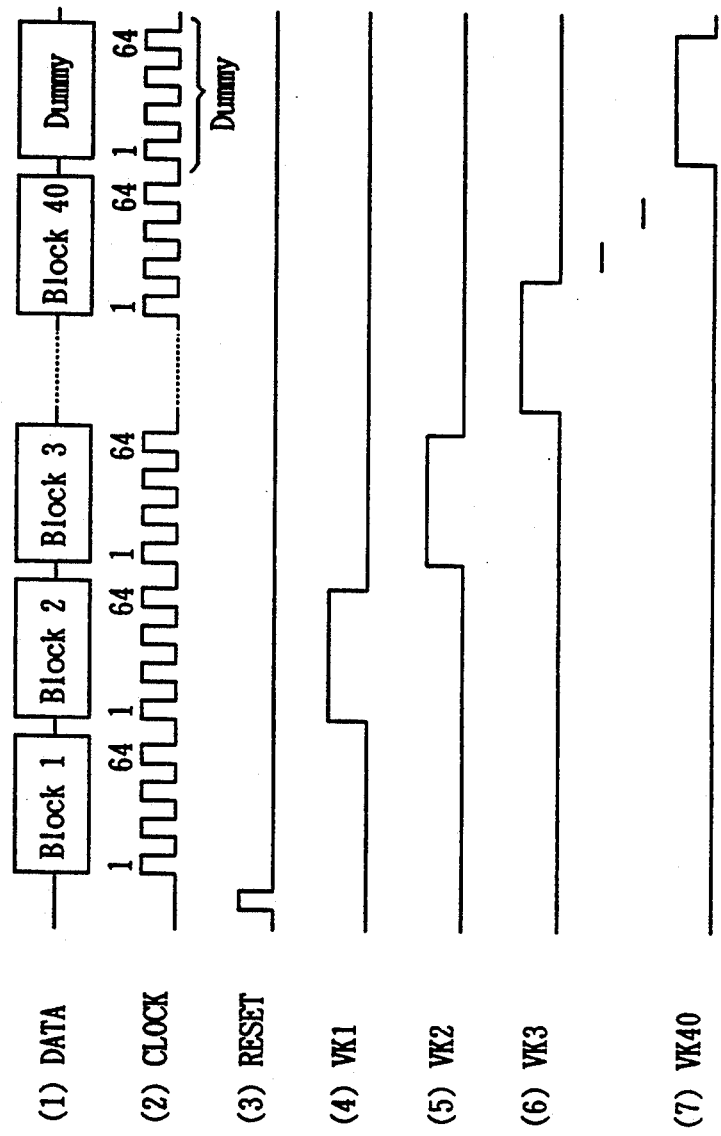
Figure 14:
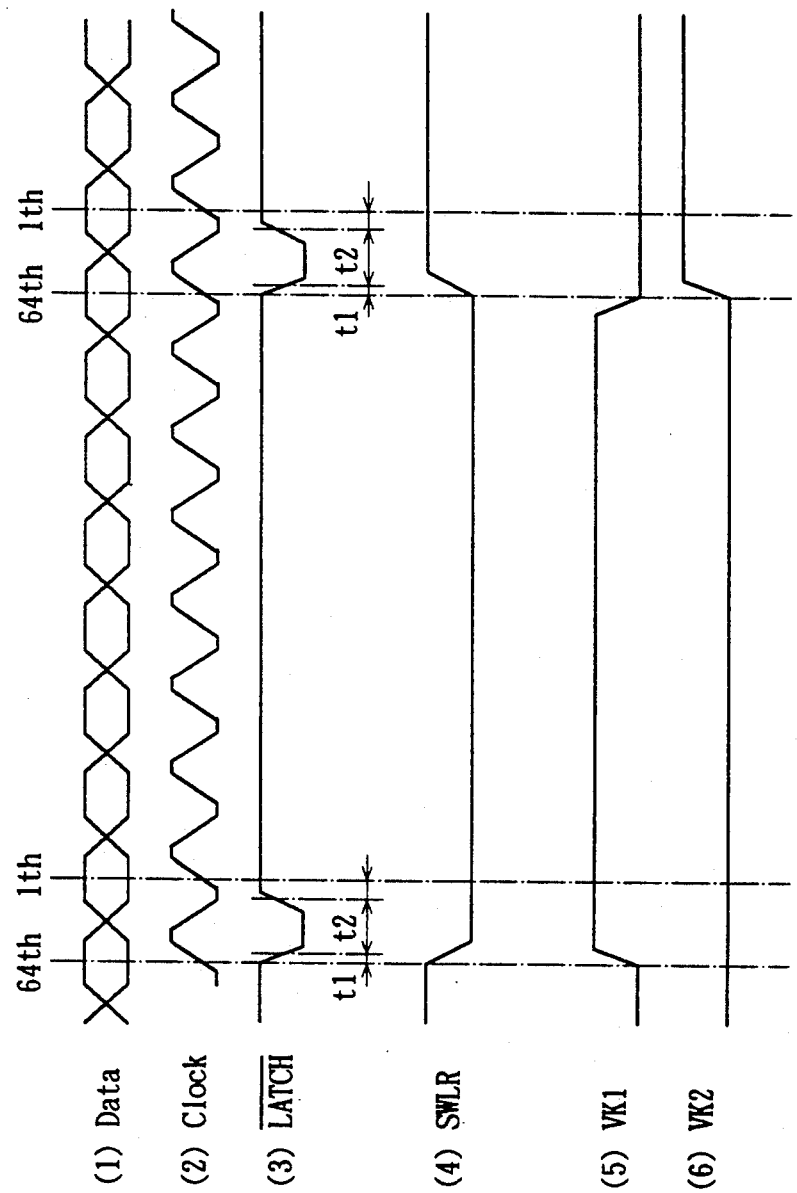

FIG. 11 shows the operating waveforms in the page reset mode. FIG. 12 shows the operating waveforms in the line reset mode. FIG. 13 shows dummy clock pulses. During dummy clock pulses, it is not necessary to give dummy print data. FIG. 14 shows the detailed waveforms of the signals. Concerning the latch signal t1 is, for example, not more than 50 nsec. t2 is from 60 to 100 nsec. After the rise of the 64th clock pulse, the latch signal is generated before the rise of the first clock pulse for the next block. The SWLR signal to the shift register 14 is inputted into the shift register 14 until the rise of the first clock pulse for the next block.

Claim:

1. A print head dividing one line printing into a plurality of printing line blocks to achieve time sharing printing block by block, said print head being connected to signal supply means composed of a CPU for serially inputting print data for each of the printing line blocks and clock pulses in synchronization with the print data, there being a selected number of clock pulses for the print data for each of the printing line blocks, and said print head comprising:

a print means for printing a pattern composed at successive parallel lines, each line being composed of a plurality of dots in a row, in response to print data for each line, said print means being divided into a plurality of print blocks, each associated with a respective one of the printing line blocks, and said print blocks being operated one at a time, a storage means for storing print data inputted by serial transfer from said signal supply means, a block detecting means for generating a block detect signal upon input of print data for one of said print blocks according to the selected number of clock pulses inputted in synchronization with the print data, a block selecting means for selecting the print blocks of the print means individually and in sequence and driving the selected one of said print blocks according to the block detect signal, wherein the storage means has a plurality of serially connected data storage stages including a first stage and a last stage, for storing print data in a selected one of a first order from the first stage to the last stage and a second order from the last stage to the first stage, the print blocks are disposed in the print means in a row which is parallel to the parallel lines of the pattern to be printed and which has first and second ends, said print head further comprises print data order selecting means for selecting either one of the first order and second order of storing print data in the storage means, said block selecting means comprise block order selecting means for selecting the print blocks of the print means in a selected one of a first order from the first end to the second end of the row and a second order from the second end to the first end of the row, said print head further comprises mode selecting means for controlling the print data order selecting means and the block order selecting means in a manner to effect printing of the pattern in a selected one of first and second modes, with the pattern in the second mode being a mirror image of the pattern in the first mode, and the block selecting means comprises a block selecting shift register having a plurality of serially connected bit storage stages including a first stage and a last stage, said shift register being operable for shifting a bit in a selected one of a first direction from said first stage to said last stage of said shift register and a second direction from said last stage to said first stage of said shift register, each block detect signal causes a bit to be shifted between serially connected stages of said block selecting shift register, and said mode selecting means control the direction in which the bit is shifted such that in the first mode the bit is shifted in the direction from the first stage to the last stage and in the second mode the bit is shifted in the direction from the last stage to the first stage.

2. A print head dividing one line printing into a plural number of printing line blocks for one line printing to achieve time sharing printing block by block, said print head being connected to signal supply means composed of a CPU for serially inputting prints data for each of the printing line blocks and clock pulses in synchronization with the print data, there being a selected number of clock pulses for the print data for each of the printing line blocks, and said print head comprising:
- a print means for printing a pattern composed of successive parallel lines, each of said lines being composed of a plurality of dots in a row, in response to print data for each of said lines, said print means being divided into a plural number of print blocks, each associated with a respective one of the printing line blocks, one of said print blocks being a last print block and said print blocks being operated one at a time,
- a storage means for storing print data inputted by serial transfer from said signal supply means,
- a block detecting means for generating a block detect signal upon input of print data for one of said print blocks according to the selected number of clock pulses inputted in synchronization with the print data,
- a block selecting means for selecting the print blocks of the print means individually and in sequence and driving the selected one of said print blocks according to the block detect signal for one line of printing so that said last print block is selected after selection of all of said print blocks other than said last print block,
- a print data stop signal generating means for transmitting a print data stop signal to said signal supply means to stop transfer of print data from said signal supply means according to the block detect signal,
- a print data request signal generating means for outwardly transmitting a print data request signal after printing is performed by each of said print blocks of the print means to initiate transfer of print data from said signal supply means, and
- a latch circuit for receiving print data for one of said print blocks which is being selected by said block selecting means, the print data being parallel-transferred from the storage means, and storing the print data therein, wherein the latch circuit receives print data for the selected one of said print blocks by parallel transfer when the block detecting means detects input of print data for the selected one of said print blocks, and the storage means receives print data for the one of said print blocks to be selected in sequence by said block selecting means upon completion of the parallel transfer of the print data for said selected one of said print blocks, wherein
- after input of print data from the latch circuit to the last one of said print blocks selected by said block selecting means for performing printing on one line, the block detecting means receives a group of clock pulses containing the selected number of clock pulses from the signal supply means, and
- the block selecting means is provided with a block number counting means for counting the block select signals from the block detecting means so that the block detecting means and the block selecting means will be reset to initial states whenever the block number counting means counts a number of blocks which is one greater than the number of print blocks for printing one line.

3. A print head of claim 2 wherein:
the storage means comprises a shift register, and print data in the shift register are parallel-transferred to the latch circuit between the clock pulses for the print data for a first one of said print blocks and the clock pulses for the print data for a second one of said print blocks which is selected by said block selecting means after the first one of said print blocks selected by said block selected means.

4. A print head of claim 2 further comprising a latch circuit for receiving print data for one of said print blocks which is being selected by block selecting means, the print data being parallel-transferred from the storage means, and storing the print data therein, wherein the latch circuit receives print data for the selected one of said print blocks by parallel transfer when the block detecting means detects input of print data for the selected one of said print blocks, and the storage means receives print data for the next one of said print blocks to be selected by said block selecting means upon completion of the parallel transfer.

5. A print head of claim 2 wherein the block selection means comprises a counter for counting block detect signals and producing a count output, and a decoder for decoding the count output of the counter.

6. A print head of claim 2 further comprising a strobe signal generating means for generating a strobe signal for feeding, according to a block detect signal, for a specified period, the print data storage in the storage means to the one of said print blocks which is being selected by said block selecting means.

7. A print head of claim 2 wherein said print data request signal generating means generate the print date request signal upon termination of the strobe signal.

8. A print head of claim 2 further comprising:
- a final block detecting means for detecting completion of print data input for one line of printing,
- wherein a signal from said final block detecting means is used to reset the block selecting means to an initial stage.

9. A print head of claim 8 wherein the shift register has a plurality of serially connected stages including a first stage and a last stage, and input means for input of print data to the shift register in a selected one of a first direction from the first stage to the last stage and a second direction from the last stage to the first stage, and further comprising an input direction reversing means for reversing the direction of input to the shift register when the block detecting means counts clock pulses for one of the printing line blocks.

10. A print head dividing one line printing into a plurality of printing line blocks to achieve time sharing printing block by block, said print head being connected to signal supply means composed of a CPU for serially inputting print data for each of the printing line blocks and clock pulses in synchronization with the print data, there being a selected number of clock pulses for the print data for each of the printing line blocks, and said print head comprising:
- a print means for printing a pattern composed of successive parallel lines, each line being composed of a plurality of dots in a row, in response to print data for each line, said print means being divided into a plurality of print blocks, each associated with a respective one of the printing line blocks, and said print blocks being operated one at a time,
- a storage means for storing print data inputted by serial transfer from said signal supply means,
- a block detecting means for generating a block detect signal upon input of print data for one of said print blocks according to the selected number of clock pules inputted in synchronization with the print data, a block selecting mean for selecting the print blocks of the print means individually and in sequence and driving the selected one of said print blocks according to the block detect signal, wherein the storage means has a plurality of serially connected data storage stages including a first stage and a last stage, for storing print data in a selected one of a first order from the first stage to the last stage and a second order from the last stage to the first stage, the print blocks are disposed in the print means in a row which is parallel to the parallel lines of the pattern to be printed and which has first and second ends, said print head further comprises print data order selecting means for selecting either one of the first order and second order of storing print data in the storage means.

said block selecting means comprise block order selecting means for selecting the print blocks of the print means in a selected one of a first order from the first end to the second end of the row and a second order from the second end to the first end of the row, said print head further comprises mode selecting means for controlling the print data order selecting means and the block order selecting means in a manner to effect printing of the pattern in a selected one of first and second modes, with the pattern in the second mode being a mirror image of the pattern in the first mode, and the block order selecting means comprises an up-down counter having a count direction which is switched over between increment and decrement under control of the mode selecting means.

* * * * *